US008386441B1

(12) United States Patent  
Clay, IV et al.

(10) Patent No.: US 8,386,441 B1  
(45) Date of Patent: Feb. 26, 2013

(54) MANAGEMENT OF LEGAL DOCUMENTS FOR TRANSACTIONS

(75) Inventors: Buckner W. Clay, IV, Sunnyvale, CA (US); David Butcher, Belmont, CA (US); Twum Djin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 467 days.

(21) Appl. No.: 12/604,241

(22) Filed: Oct. 22, 2009

(51) Int. Cl.
*G06F 7/00* (2006.01)
*G06F 17/00* (2006.01)

(52) U.S. Cl. .................. 707/689; 707/695; 707/942

(58) Field of Classification Search .......... 707/689, 707/732, 733, 784, 942, 607, 695
See application file for complete search history.

(56) References Cited

U.S. PATENT DOCUMENTS

| | | | |
|---|---|---|---|
| 6,141,653 A | 10/2000 | Conklin et al. | |
| 6,260,024 B1 | 7/2001 | Shkedy | |
| 6,754,636 B1 | 6/2004 | Walker et al. | |
| 6,886,101 B2 * | 4/2005 | Glazer et al. | 726/26 |
| 2002/0010784 A1 * | 1/2002 | Clayton et al. | 709/229 |
| 2002/0104015 A1 * | 8/2002 | Barzilai et al. | 713/201 |
| 2002/0178074 A1 | 11/2002 | Bloom | |
| 2006/0075122 A1 * | 4/2006 | Lindskog et al. | 709/228 |
| 2006/0136985 A1 * | 6/2006 | Ashley et al. | 726/1 |
| 2008/0222244 A1 * | 9/2008 | Huang et al. | 709/203 |
| 2008/0281834 A1 * | 11/2008 | Wu et al. | 707/100 |

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.
"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.
Letter from Ed Stevens, Fire Poppy, Inc. to Jim Hudson, Sullivan Products, dated Sep. 12, 2000, 6 pages.
Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>; <http://shopatron.ooi.net/checkout1.phtml>; <http://shopatron.ooi.netlcheckout3.phtml?multi=>; <http://shopatron.ooi.netlcheckout4.phtml>.

\* cited by examiner

*Primary Examiner* — James E Richardson
(74) *Attorney, Agent, or Firm* — Fenwick & West LLP

(57) ABSTRACT

Information describing a transaction is received and a set of hierarchical documents pertinent to the transaction are identified based at least in part on the received information. The set of hierarchical documents is pruned responsive to data describing documents that a user involved in the transaction has previously accepted. Information describing the pruned set of hierarchical documents is output for presenting the pruned set of hierarchical documents to the user involved in the transaction for acceptance as part of the transaction.

21 Claims, 4 Drawing Sheets

MANAGEMENT OF LEGAL DOCUMENTS FOR TRANSACTIONS

BACKGROUND OF THE INVENTION

1. Field of the Invention

This invention pertains in general to electronic transactions, and more specifically to managing acceptances of legal documents pertinent to transactions.

2. Description of the Related Art

Different types of transactions occur over the Internet every day, such as a user purchasing an item from a merchant or a user registering to use a service. Usually involved with each transaction are one or more legal documents. The legal documents describe terms to which parties involved with the transaction must abide and other disclosures relevant to the transaction. For example, legal documents associated with a user registering to use a service may include terms such as the required age of the user, service fees, limitations on the use of the service, and the process for resolving a dispute.

Oftentimes, the transaction cannot be performed unless one or more parties involved assent to the terms described by the legal documents associated with the transaction. For example, in order to complete the registration to use a service, the user registering for the service must accept the terms of certain legal documents provided by the service provider. However, determining which legal documents to present to a user for a transaction is difficult because various factors are involved in the determination. Factors involved may for example include: the parties involved in the transaction, the locations of the parties, the type of the transaction, terms of legal documents the user has previously accepted, and changes to the transaction terms for legal or other reasons. Thus, there is a need in the art for an efficient way to determine which legal documents to present to a user as part of a transaction.

BRIEF SUMMARY OF THE INVENTION

Methods, computer program products, and computer systems are described for determining a set of legal documents to present to a user for acceptance as part of a transaction. Embodiments of the method comprise receiving information describing a transaction. A set of hierarchical documents pertinent to the transaction are identified based at least in part on the received information. The set of hierarchical documents is pruned responsive to data describing documents that a user involved in the transaction has previously accepted. Information describing the pruned set of hierarchical documents is output for presenting the pruned set of hierarchical documents to the user involved in the transaction for acceptance as part of the transaction.

Embodiments of the computer program product have a computer-readable storage medium having computer-executable code. The computer-executable code when executed receives information describing a transaction. A set of hierarchical documents pertinent to the transaction are identified based at least in part on the received information. The set of hierarchical documents is pruned responsive to data describing documents that a user involved in the transaction has previously accepted. Information describing the pruned set of hierarchical documents is output for presenting the pruned set of hierarchical documents to the user involved in the transaction for acceptance as part of the transaction.

Embodiments of the computer system comprise a computer processor and a computer-readable storage medium storing computer program module configured to execute on the computer processor. The computer program modules comprise a communications module configured to receive information describing a transaction. The computer program modules comprises a documents module configured to identify a set of hierarchical documents pertinent to the transaction based at least in part on the received information. Further, the computer program modules comprise a verification module configured to prune the set of hierarchical documents responsive to data describing documents that a user involved in the transaction has previously accepted. The verification module is further configured to output information pertaining to the pruned set of hierarchical documents for presenting the pruned set of hierarchical documents to the user involved in the transaction for acceptance as part of the transaction.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

I. Overview

Figure 1:
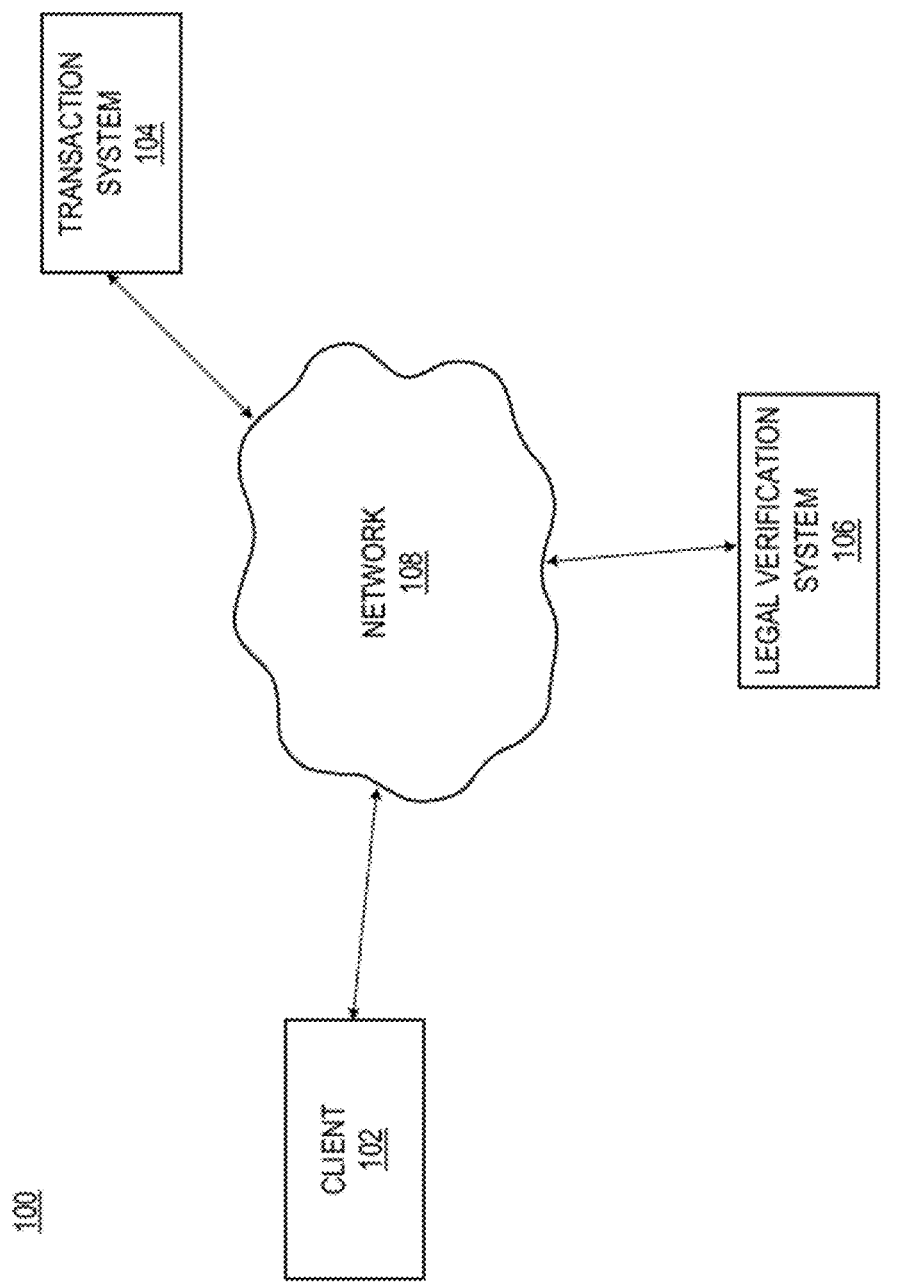
FIG. 1 is a high-level block diagram of a computing environment according to one embodiment.

FIG. 1 is a high-level block diagram of a computing environment 100 according to one embodiment. FIG. 1 illustrates a client 102, a transaction system 104, and a legal verification system 106 connected via a network 108. Although only one of each entity is shown in FIG. 1, embodiments can have multiple clients 102, transaction systems 104, and legal verification systems 106.

The client 102 is a device used by a user to communicate with the transaction system 104 and other entities on the network 108. The client can be, for example, a personal computer, smart phone, or other electronic device executing a web browser such as GOOGLE CHROME, MICROSOFT INTERNET EXPLORER, or MOZILLA FIREFOX which allows the user to retrieve and display content from web servers and other entities on the network 108.

The user uses the client 102 to interact with the transaction system 104 to perform a transaction. The transaction may be any type of transaction that can be made via the network 108. In one embodiment, the transaction is an electronic commerce transaction, such as the user purchasing an item from a merchant or the user placing an item for sale. The transaction may also be, for example, the user using or registering to use a network-based service such as a web-based email account, payment system, video sharing site, or social networking site. Typically, the user performs the transaction by using the client 102 to view web pages provided by the transaction system 104 and providing information to the transaction system via forms in the web pages. For example, if the user is purchasing an item, the user can provide the transaction system 104 with information including an account identifier (e.g., username), payment instrument (e.g., credit card number), and shipping address.

The transaction system 104 interacts with the client 102 via the network to perform the transaction. The transaction system 104 can be a payment system used by a merchant to allow clients 102 to perform payment transactions. For example, the transaction system 104 may be GOOGLE CHECKOUT provided by GOOGLE INC. of Mountain View, Calif. The transaction system 104 can also be an account management system that lets a user establish an account, or log into an existing account, for a network-based service such as GMAIL or YOUTUBE provided by GOOGLE INC. or other services. The transaction system 104 can be integrated into the entity that provides the services or remote from the entity, depending upon the embodiment.

As mentioned above, an embodiment of the transaction system 104 includes a web server that provides web pages for performing the transaction to the client 104 and receives information submitted by the client 104. In one embodiment, the transaction system 104 presents the user with one or more legal documents as part of the transaction. The legal documents describe the terms of the transaction and make disclosures relevant to the transaction. For example, the legal documents can describe the terms of the electronic commerce transaction, the terms of use for a network-based service, and describe a privacy policy of the entity providing the service. Typically, the user of the client 102 must assent to the terms and/or acknowledge receipt of the disclosure in order to perform the transaction. The transaction system 104 interacts with the legal verification system 106 to determine which, if any, legal documents to present to the user as part of the transaction.

The legal verification system 106 determines the legal documents to present to a user of a client 102 as part of a transaction conducted by the transaction system 104. In one embodiment, the legal verification system 106 receives a description of the transaction from the transaction system 104 and determines the legal documents based on the description and other information. The description can include, for example, the type of transaction, the geographic locations (e.g., jurisdictions) involved in the transaction, and the identity of the user. The legal verification system 106 uses this information to ascertain the legal documents pertinent to the transaction, and also determines the legal documents that have been previously accepted by the user. Based on this information, the legal verification system determines what, if any, legal documents should be presented to the user as part of the current transaction. The legal verification system 106 provides these legal documents, and/or descriptions of these documents, to the transaction system 104 so that the documents can be presented to the user of the client 102.

The network 108 represents the communication pathways between the client 102, transaction system 104, and legal verification system 106. In one embodiment, the network 108 is the Internet and uses standard communications technologies and/or protocols. Thus, the network 108 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 108 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

II. System Architecture

Figure 2:
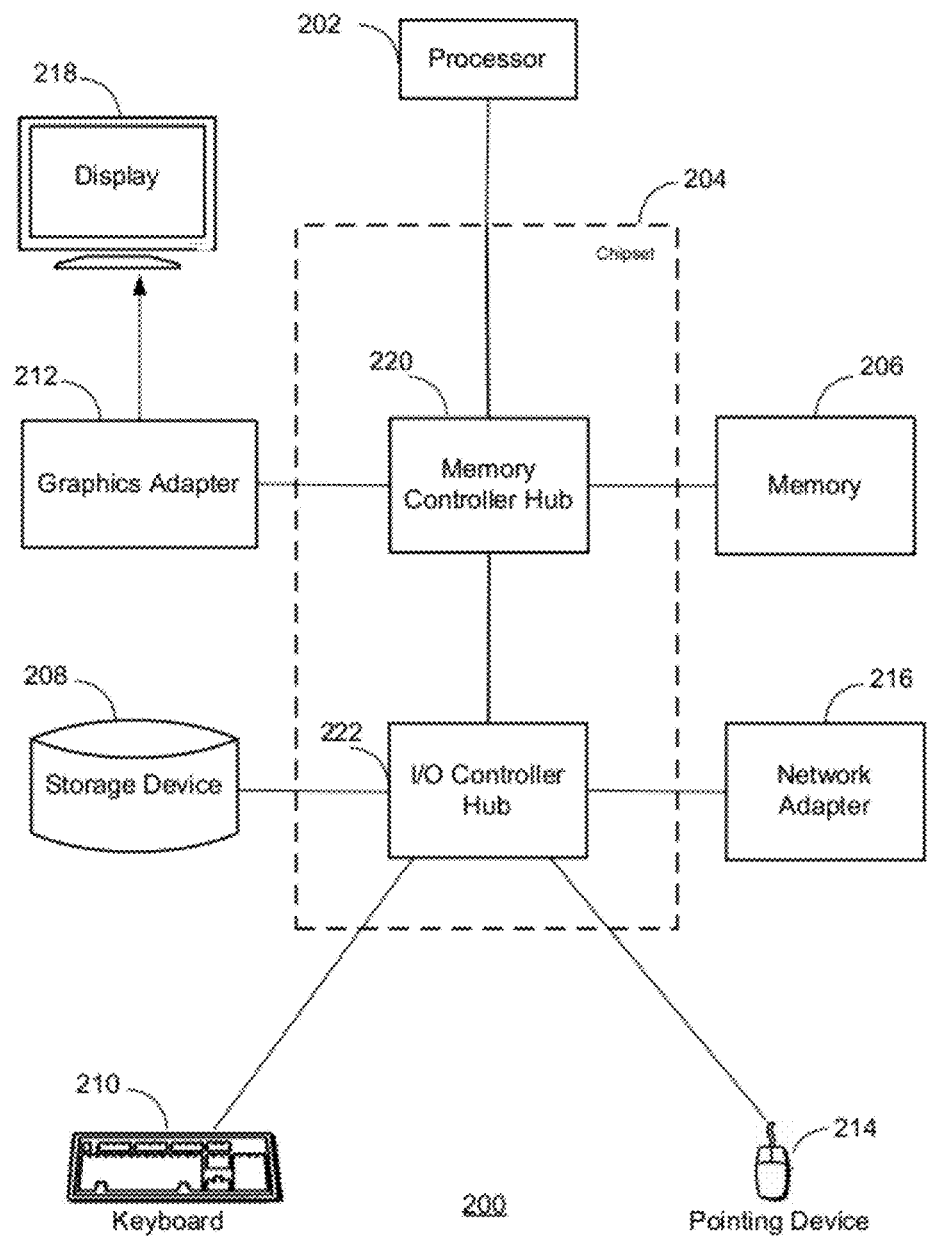
FIG. 2 is a high-level block diagram illustrating a functional view of a typical computer system for use as one of the entities illustrated in the environment of FIG. 1 according to an embodiment.

FIG. 2 is a high-level block diagram illustrating a functional view of a typical computer system for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as the transaction system 104 or legal verification system 106 lacks a keyboard 210, pointing device 214, graphics adapter 212, and/or display 218. Moreover, the storage device 208 can be local and/or remote from the computer 200 (such as embodied within a storage area network (SAN)).

The computer 200 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 208, loaded into the memory 206, and executed by the processor 202.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
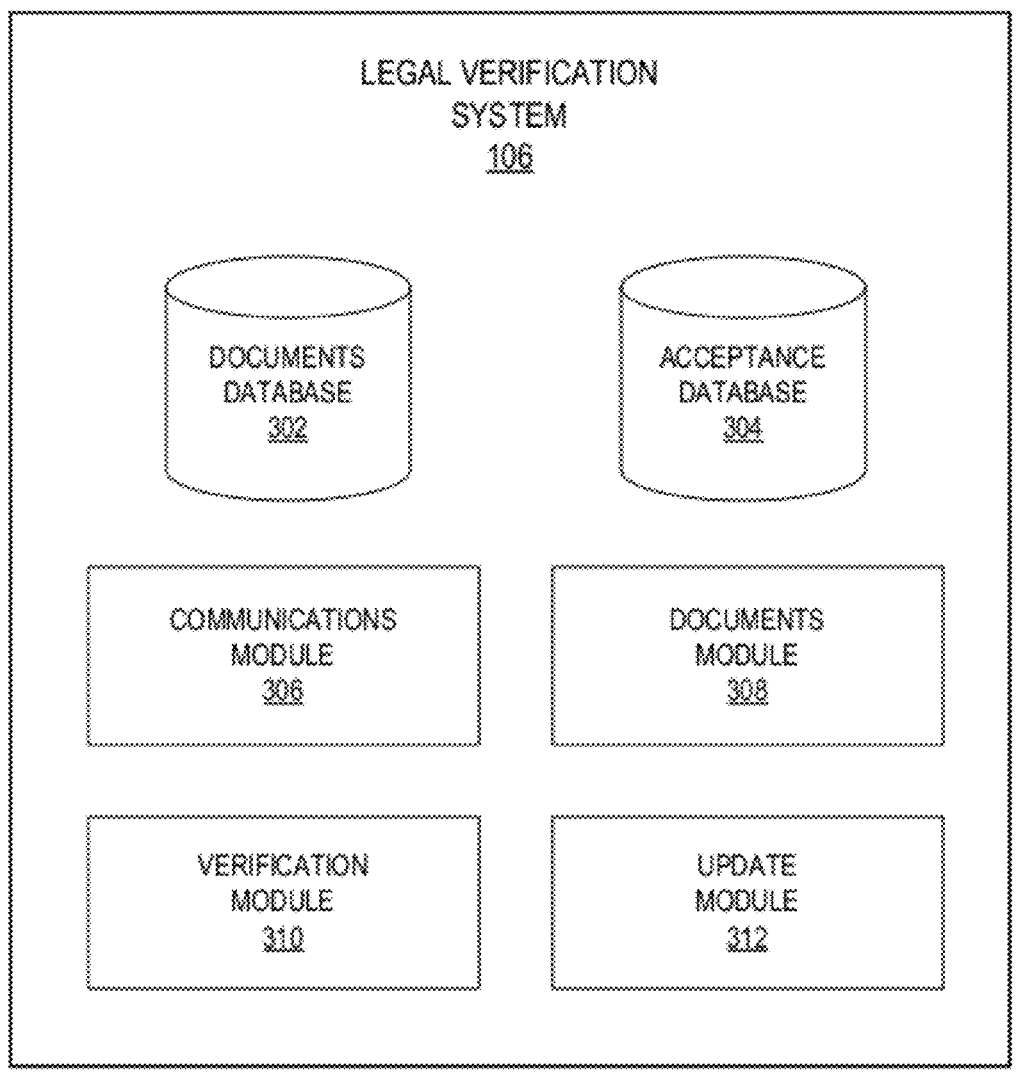
FIG. 3 is a high-level block diagram illustrating modules within a legal verification system according to one embodiment.

FIG. 3 is a high-level block diagram illustrating modules within the legal verification system 106 according to one embodiment. Those of skill in the art will recognize that other embodiments can have different and/or other modules than the ones described here, and that the functionalities can be distributed among the modules in a different manner.

The legal verification system 106 includes a documents database 302, acceptance database 304, communications module 306, documents module 308, verification module 310, and update module 312. The documents database 302 stores legal documents that are presented to users during transactions. In one embodiment, each document stored in the documents database 302 is identified by a unique identifier, is associated with at least one transaction type, and is associated with at least one location. Therefore, the document database 302 can be queried to identify documents pertinent to particular transactions conducted at particular locations.

A legal document can be associated with any type of transaction that the transaction system 104 is capable of conducting. In one embodiment, the different types of transactions are identified by a transaction type schema shared by the transaction system 104 and legal verification system 106. For example, each type of transactions can be identified by a unique transaction identifier and the document database 302 can use these identifiers to associate legal documents and transaction types. Similarly, the different locations of the transactions are identified by a shared location schema and the document database 302 can use this schema to associate legal documents and locations. For example, a legal document may be associated with the transaction type of purchasing an item and with the location of Australia.

In one embodiment, the documents stored in the documents database 302 are named using a naming convention that identifies the location with which the document is associated. For example, the file containing the document can have a file extension representing the location associated with the document. In one embodiment, the file extension is a two character code from the ISO 3166 standard which represents the country associated with the document. For example, a document can be named "buyer.au," where the ".au" portion of the name signifies that the document is associated with the country of Australia.

In one embodiment, the legal documents stored in the database 302 are organized into hierarchies describing the relationships among the documents. Each hierarchy is in the form of a directed acyclic graph (DAG) and describes the documents associated with one or more particular types of transactions in particular locations. A given hierarchy includes a root legal document at its root and one or more dependency documents below the root in the hierarchy. For example, at the root of the hierarchy may be buyer.au, a direct dependent of buyer.au may be products.au, and a dependent of products.au may be conditions.au. Here, products.au and conditions.au are both dependency documents of buyer.au. Further, conditions.au is considered a dependency document of products.au.

Each root legal document is associated with one or more transaction types and locations. Through a root legal document, the root document's dependency documents are also associated with the transaction types and locations of the root document. Following the example from above, assume buyer.au is associated with the transaction type of a purchase and the location of Australia. Through buyer.au, dependency documents products.au and conditions.au are also associated with the transaction type of a purchase and the location of Australia.

In one embodiment, a root document stored in the documents database 302 can be an empty document that does not contain any terms or disclosure. In other words, the empty document does not include content to present to a user. Instead, the empty document serves to identify the dependency documents for the one or more transaction types and locations with which the root document is associated. Following the example from above, the buyer.au document may be empty and serve to identify the dependency documents products.au and conditions.au.

A legal document stored in the documents database 302 can include metadata that describes the document. In one embodiment, a document's metadata specifies the document's dependency documents. Depending upon the embodiment, the metadata can specify only the dependency documents that are directly dependent on the document, or the metadata can specify the dependency documents that are both directly dependent and indirectly dependent (i.e., dependent through another document) on the document.

The metadata can describe other aspects of the document, including the versioning and change history for the document, a validity period for the document, an effective date for the document, etc. The validity period describes a period of time when the document is valid and should be presented as part of a transaction if the document is pertinent to the transaction. In one embodiment, the metadata describe a grace period for a document. Generally, a document's grace period is a period of time in which the document is valid but not required to be accepted by a user as part of a transaction. For example, a legal document containing an updated version of an earlier document can have a grace period where the updated document is presented in transactions involving users that have not accepted the earlier version of the document, but where users that have already accepted the earlier version are not required to accept the updated version.

The acceptance database 304 stores information describing legal documents that have been accepted by users. This acceptance information is provided to the legal verification system 106 by the transaction system 104 when a user accepts a legal document presented during a transaction. The user's acceptance can occur, for example, when the user performs a positive action such as checking a box to indicate that the user has reviewed and agrees to, or otherwise assents to, the terms described by the legal document. It should be understood that when a user accepts a legal document, the user is accepting only the version of the document presented to him or her.

The received acceptance information can include, for example, an identifier of the user and an identifier of the legal document that the user has accepted. The acceptance database 304 identifies the users using their unique identifiers, such as the users' usernames, and, for each user, stores information describing the legal documents that the user has accepted. An embodiment of the acceptance database 304 also stores detailed information about each acceptance, such as the date and time of the acceptance and the Internet Protocol (IP) address of the client 102 from which the user accepted the document. The acceptance database 304 may also store other information associated with a user, such as contact information and a billing address.

The communications module 306 handles communications with the transaction system 104 and client 102 via the network 108. In one embodiment, the communications module 306 receives requests from the transaction system 104 for legal documents to present to a user as part of a transaction. A request received by the communications module 306 includes a description of the transaction associated with the request. In one embodiment, the description includes the type of the transaction, the identity of the user involved in the transaction, and at least one geographic location involved in the transaction (e.g., the user's billing address).

The documents module 308 identifies a set of legal documents that are pertinent to a transaction. When the communication module 306 receives a request describing a transaction, the documents module 308 uses the description of the transaction to query the documents database 302. Based on the query, the documents module 308 identifies a set of legal documents that are pertinent to the transaction.

In one embodiment, the documents module 308 queries the documents database 302 using the transaction type and the at least one geographic location identified in the transaction description to identify a root legal document associated with the transaction type and location. For example, if the transaction type is selling an item and the location of the seller is the United States, the documents module 308 queries the documents database 302 to find the root legal document associated with selling an item in the United States.

The documents module 308 analyzes the metadata of the identified root legal document to identify the dependency documents within the root document's hierarchy. The root legal document and dependency documents identified by the documents module 308 represent the set of legal documents that are pertinent to the transaction. The identified set may also be referred to as the set of hierarchical legal documents pertinent to the transaction.

In one embodiment, the documents module 308 is able to identify all of the dependency documents within the hierarchy based only on the metadata of the root document. In another embodiment, the documents module 308 analyzes the metadata of one or more dependency documents to identify all of the dependency documents within the hierarchy. For example, the documents module 308 analyzes the metadata of the root document to identify the root document's directly dependent documents ("first level documents"). The documents module 308 then analyzes the metadata of first level documents to identify the first level documents' directly dependent documents ("second level documents"). This process continues until all of the documents in the hierarchy are identified.

The verification module 310 determines which legal documents in the set identified by the documents module 308 should be presented to a user as part of a transaction. In general, the verification module 310 determines the document to present by ascertaining the full set of documents pertinent to the transaction identified by the documents module 308 and then pruning articles that need not be presented for various reasons. For example, the verification module 310 prunes legal documents which the user has previously accepted, documents which are not within their validity periods, documents that are valid but within a grace period and for which the user has previously accepted a different version of the document, etc.

In one embodiment, the verification module 310 uses pruning criteria to prune the articles. In general, the pruning criteria include a set of rules describing when to prune a document from the set of documents pertinent to the transaction. One pruning criterion prunes a document if the user has already accepted that version of the document. The verification module 310 queries the acceptance database 304 using the identity of the user associated with the transaction and the identity of the document. If the information stored in the database 304 indicates that user has previously accepted the document, the verification module 310 prunes the document from the set.

Another criterion analyzes the metadata of a document to determine whether the document is within its validity or grace periods. If the metadata indicates that the documents is not within its validity period or indicates that document is in a grace period, the verification module 310 prunes the document from the set. One pruning criterion analyzes the metadata of a document to determine whether acceptance of a prior version of the document is effective as to the subsequent version of the document in the set. If acceptance of a prior version is effective and the user associated with the transaction has accepted the prior version, the verification module 310 prunes the document from the set. Such a criterion is useful, for example, when the current version merely corrects typographical or other minor errors in the prior version of the document. The pruning criteria can also prune empty documents. Thus, the pruning criteria allow for flexible pruning based on a variety of factors.

The verification module 310 provides the transaction system 104 with a description of the legal documents in the pruned set. The transaction system 104 can then retrieve the documents in the pruned set and present them to the user. In another embodiment, the verification module 310 retrieves each of the documents in the set from the documents database 302 and transmits the documents to the transaction system 104. In one embodiment, the verification module 310 transmits the documents directly to the client 102 for presentation. If all of the pertinent documents have been pruned, as would occur for example, if the user has previously accepted all of the documents, the verification module 310 notifies the transaction system 104 that no legal documents need to be presented to the user as part of the transaction.

The update module 312 maintains the acceptance database 304. When the communications module 306 receives from the transaction system 104 or the client 102 information indicating that a user accepted a legal document, the update module 312 updates the user's information in the acceptance database 304. The updated information reflects that the user has accepted the legal document. In updating the user's information, the update module 312 includes detailed information about the acceptance, such as the date and time of the acceptance and the IP address of the client 102 from which the user accepted the document.

III. Process/Examples

Figure 4:
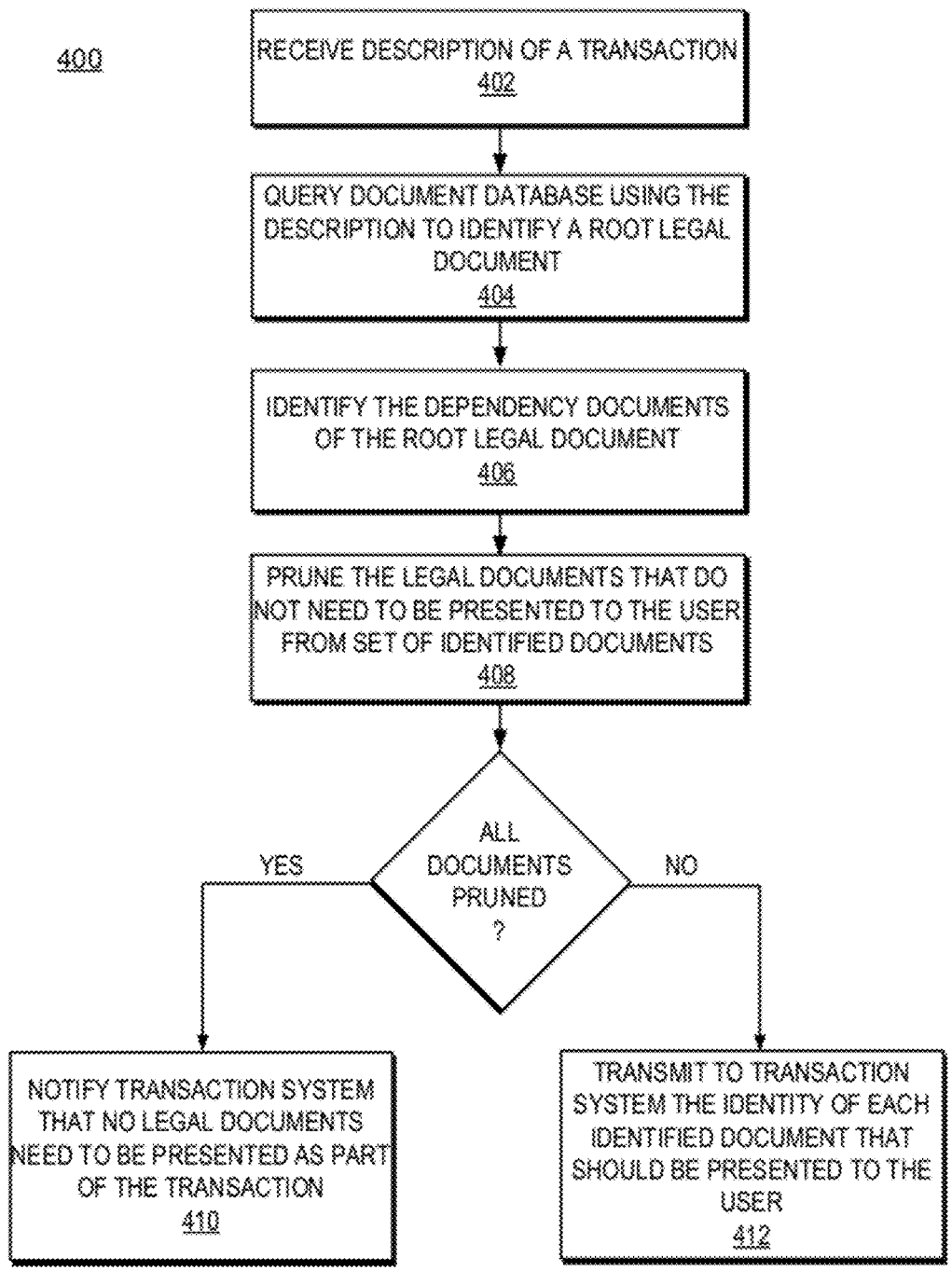
FIG. 4 is a flow chart illustrating the operations of the legal verification system according to one embodiment.

FIG. 4 is a flow chart 400 illustrating the operations of the legal verification system 106 according to one embodiment. Those of skill in the art will recognize that other embodiments can perform the steps of FIG. 4 in different orders. Moreover, other embodiments can include different and/or additional steps than the ones described here.

Assume for purposes of this example that the transaction system 104 and a user at the client 102 are communicating in order to complete a transaction. The legal verification system 106 receives 402 from the transaction system 104 a description of the transaction. The description is received in a request for legal documents to present to the user as part of the transaction. In one embodiment, the description received from the transaction system 104 includes the type of the transaction, the identity of the user involved in the transaction, and at least one geographic location involved in the transaction (e.g., the user's billing address).

The legal verification system 106 queries 404 the documents database 302 using the description to identify a root legal document associated with the transaction. In one embodiment, the legal verification system 106 identifies the root legal document based on the transaction type and the geographic location associated with the user. Based on the metadata of the root legal document returned by the query, the legal verification system 106 identifies 406 the dependency documents of the root legal document. The identified root legal document and dependency documents represent a set of hierarchical legal documents that are pertinent to the transaction.

Based on information stored in the acceptance database 304 and pruning criteria, the legal verification system 106 prunes 408 the legal documents that do not need to be presented to the user from the set of pertinent legal documents. If all of documents are pruned, the legal verification system 106 notifies 410 the transaction system 104 that no legal documents need to be presented to the user as part of the transaction. On the other hand, if at least one legal document is not pruned, the legal verification system 106 transmits 412 to the transaction system 104 the identity of each of the identified pertinent document that should be presented to the user as part of the transaction.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The disclosure of the present invention is intended to be illustrative, but not limiting, of the full scope of the invention, which is set forth in the following claims.

The invention claimed is:

1. A computer-implemented method for determining a set of legal documents to present to a user for acceptance as part of a transaction, the method comprising:
   receiving information describing a type of transaction and a geographic location associated with the transaction;
   identifying a set of hierarchical documents pertinent to the transaction based at least in part on the received information, the set including a root document identified based at least in part on the type of transaction and the geographic location associated with the transaction, the root document specifying a transaction identifier of the transaction and metadata, the set further including one or more dependency documents of the root document identified responsive to an analysis of the metadata specified by the root document;
   pruning the set of hierarchical documents responsive to data describing documents that a user involved in the transaction has previously accepted; and
   outputting information pertaining to the pruned set of hierarchical documents for presenting the pruned set of hierarchical documents to the user involved in the transaction for acceptance as part of the transaction.

2. The method of claim 1, wherein the root document is an empty document without content for presenting to the user and serves to identify the dependency documents.

3. The method of claim 1, wherein pruning the set of hierarchical documents comprises:
   removing a document from the hierarchical set, responsive to the document having been previously accepted by the user.

4. The method of claim 1, wherein pruning the set of hierarchical documents comprises:
   identifying metadata associated with the set of hierarchical documents; and
   applying pruning criteria to the metadata associated with the set of hierarchical documents.

5. The method of claim 4, wherein the pruning criteria comprise rules for removing documents from the set of hierarchical documents and wherein applying the pruning criteria comprises:
   analyzing the metadata associated with the set of hierarchical documents in view of the pruning criteria to identify the pruned set of hierarchical documents.

6. The method of claim 1, wherein pruning the set comprises:
   responsive to a document in the hierarchical set being outside of a validity period where the document is valid, removing the document from the hierarchical set.

7. The method of claim 1, wherein pruning the set comprises:
   responsive to identifying a document in the hierarchical set that has not been accepted by the user and acceptance of a prior version of the document being satisfactory, determining whether the user has accepted the prior version of the document; and
   responsive to determining that the user has accepted the prior version of the document, removing the document from the hierarchical set.

8. A computer program product having a non-transitory computer-readable storage medium having computer-executable code for determining a set of legal documents to present to a user for acceptance as part of a transaction, the computer-executable code when executed performing steps comprising:
   receiving information describing a type of transaction and a geographic location associated with the transaction;
   identifying a set of hierarchical documents pertinent to the transaction based at least in part on the received information, the set including a root document identified based at least in part on the type of transaction and the geographic location associated with the transaction, the root document specifying a transaction identifier of the transaction and metadata, the set further including one or more dependency documents of the root document identified responsive to an analysis of the metadata specified by the root document;
   pruning the set of hierarchical documents responsive to data describing documents that a user involved in the transaction has previously accepted; and
   outputting information pertaining to the pruned set of hierarchical documents for presenting the pruned set of hierarchical documents to the user involved in the transaction for acceptance as part of the transaction.

9. The computer program product of claim 8, wherein the root document is an empty document without content for presenting to the user and serves to identify the dependency documents.

10. The computer program product of claim 8, wherein pruning the set of hierarchical documents comprises:
   removing a document from the hierarchical set, responsive to the document having been previously accepted by the user.

11. The computer program product of claim 8, wherein pruning the set of hierarchical documents comprises:
- identifying metadata associated with the set of hierarchical documents; and
- applying pruning criteria to the metadata associated with the set of hierarchical documents.

12. The computer program product of claim 11, wherein the pruning criteria comprise rules for removing documents from the set of hierarchical documents and wherein applying the pruning criteria comprises:
- analyzing the metadata associated with the set of hierarchical documents in view of the pruning criteria to identify the pruned set of hierarchical documents.

13. The computer program product of claim 8, wherein pruning the set comprises:
- responsive to a document in the hierarchical set being outside of a validity period where the document is valid, removing the document from the hierarchical set.

14. The computer program product of claim 8, wherein pruning the set comprises:
- responsive to identifying a document in the hierarchical set that has not been accepted by the user and acceptance of a prior version of the document being satisfactory, determining whether the user has accepted the prior version of the document; and
- responsive to determining that the user has accepted the prior version of the document, removing the document from the hierarchical set.

15. A computer system for determining a set of legal documents to present to a user for acceptance as part of a transaction, the system comprising:
- a computer processor; and
- a non-transitory computer-readable storage medium storing computer program modules configured to execute on the computer processor, the computer program modules comprising:
  - a communications module configured to receive information describing a type of transaction and a geographic location associated with the transaction;
  - a documents module configured to identify a set of hierarchical documents pertinent to the transaction based at least in part on the received information, the set including a root document identified based at least in part on the type of transaction and the geographic location associated with the transaction, the root document specifying a transaction identifier of the transaction and metadata, the set further including one or more dependency documents of the root document identified responsive to an analysis of the metadata specified by the root document;
  - a verification module configured to:
    - prune the set of hierarchical documents responsive to data describing documents that a user involved in the transaction has previously accepted; and
    - output information pertaining to the pruned set of hierarchical documents for presenting the pruned set of hierarchical documents to the user involved in the transaction for acceptance as part of the transaction.

16. The computer system of claim 15, wherein the root document is an empty document without content for presenting to the user and serves to identify the dependency documents.

17. The computer system of claim 15, wherein the verification module is further configured to:
- remove a document from the hierarchical set, responsive to the document having been previously accepted by the user.

18. The computer system of claim 15, wherein the verification module is further configured to:
- identify metadata associated with the set of hierarchical documents; and
- apply pruning criteria to the metadata associated with the set of hierarchical documents.

19. The computer system of claim 18, wherein the pruning criteria comprise rules for removing documents from the set of hierarchical documents and wherein the verification module is further configured to:
- analyze the metadata associated with the set of hierarchical documents in view of the pruning criteria to identify the pruned set of hierarchical documents.

20. The computer system of claim 15, wherein the verification module is further configured to:
- remove a document from a hierarchical set, responsive to a document in the hierarchical set being outside of a validity period where the document is valid.

21. The computer system of claim 15, wherein the verification module is further configured to:
- determine whether the user has accepted a prior version of a document, responsive to identifying a document in the hierarchical set that has not been accepted by the user and acceptance of a prior version of the document being satisfactory; and
- remove the document from the hierarchical set, responsive to determining that the user has accepted the prior version of the document.

* * * * *